US012031559B1

(12) United States Patent
Busquets et al.

(10) Patent No.: US 12,031,559 B1
(45) Date of Patent: Jul. 9, 2024

(54) INTEGRATED ELECTRO-HYDRAULIC UNIT

(71) Applicant: Robert Bosch GmbH, Stuttgart (DE)

(72) Inventors: Enrique Busquets, Greer, SC (US); Andreas Guender, Lohr Am Main (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 18/348,760

(22) Filed: Jul. 7, 2023

(51) Int. Cl.
*F04B 17/03* (2006.01)
*F15B 15/14* (2006.01)
*F04B 1/20* (2020.01)

(52) U.S. Cl.
CPC ............ *F15B 15/1404* (2013.01); *F04B 1/20* (2013.01); *F04B 17/03* (2013.01)

(58) Field of Classification Search
CPC ......... F04B 1/20; F04B 17/03; F15B 15/1404
See application file for complete search history.

(56) References Cited

U.S. PATENT DOCUMENTS

| | | | | |
|---|---|---|---|---|
| 1,849,222 | A | 3/1932 | Canton | |
| 3,295,457 | A | 1/1967 | George | |
| 4,075,843 | A | 2/1978 | Leker | |
| 4,529,362 | A | 7/1985 | Ichiryu et al. | |
| 4,729,717 | A | 3/1988 | Gupta | |
| 4,850,812 | A * | 7/1989 | Voight | F04B 17/03 417/357 |
| 5,105,723 | A | 4/1992 | Kazahaya et al. | |
| 5,141,402 | A | 8/1992 | Bloomquist et al. | |
| 5,220,225 | A | 6/1993 | Moon, Jr. | |
| 5,354,182 | A | 10/1994 | Niemiec et al. | |
| 5,591,013 | A * | 1/1997 | Kawafune | F04B 1/20 417/271 |
| 5,708,311 | A * | 1/1998 | Claar | F04B 1/20 417/372 |
| 6,361,285 | B1 | 3/2002 | Lehner | |
| 6,769,745 | B2 | 8/2004 | Mohr et al. | |
| 7,182,583 | B2 | 2/2007 | Gandrud et al. | |
| 8,358,042 | B2 | 1/2013 | Yamada et al. | |
| 9,175,672 | B2 | 11/2015 | Ohno et al. | |
| 10,677,207 | B2 | 6/2020 | Ashton et al. | |

(Continued)

FOREIGN PATENT DOCUMENTS

| | | |
|---|---|---|
| CN | 102536722 B | 9/2014 |
| CN | 103437975 B | 11/2015 |

(Continued)

*Primary Examiner* — Thomas E Lazo
(74) *Attorney, Agent, or Firm* — Michael Best & Friedrich LLP

(57) ABSTRACT

An integrated electro-hydraulic unit including a hydraulic machine having a shaft configured to rotate about an axis and a cylinder block. The cylinder block includes a distal portion spaced from the axis. The distal portion includes an axial span measured parallel to the axis. An electric machine has a stator and a rotor with an axial span measured parallel to the axis. The axial span of the rotor is larger than the axial span of the distal portion. A drive flange is situated between the distal portion and the rotor to define an interface. The rotor is secured to a rotor-receiving portion of the drive flange, and the distal portion is secured to a cylinder block-receiving portion of the drive flange. The axial span of the distal portion extends outside the axial span of the rotor.

16 Claims, 17 Drawing Sheets

(56) References Cited

U.S. PATENT DOCUMENTS

| | | | | |
|---|---|---|---|---|
| 11,255,359 | B2 | 2/2022 | Jagoda et al. | |
| 2002/0153768 | A1 | 10/2002 | Mohr et al. | |
| 2005/0175479 | A1 | 8/2005 | Gandrud et al. | |
| 2011/0001370 | A1 * | 1/2011 | Yamada .................. | F04B 17/03<br>310/75 R |
| 2013/0315758 | A1 | 11/2013 | Olson | |
| 2020/0256336 | A1 | 8/2020 | Terzo et al. | |
| 2022/0166284 | A1 | 5/2022 | Busquets et al. | |

FOREIGN PATENT DOCUMENTS

| | | | | | |
|---|---|---|---|---|---|
| CN | 106089624 | A | | 11/2016 | |
| CN | 106286195 | A | * | 1/2017 | ................ F04B 1/20 |
| CN | 106286195 | A | | 1/2017 | |
| DE | 19650270 | A1 | | 6/1998 | |
| DE | 10331191 | A1 | * | 1/2005 | ................ F04B 1/20 |
| DE | 102007058858 | A1 | | 6/2009 | |
| EP | 0578390 | A1 | | 1/1994 | |
| EP | 0611887 | A1 | | 8/1994 | |
| EP | 0819848 | B1 | | 6/2003 | |
| EP | 1462647 | A2 | | 9/2004 | |
| EP | 1536139 | A1 | | 6/2005 | |
| EP | 0932773 | B1 | | 3/2006 | |
| EP | 1669599 | A1 | | 6/2006 | |

* cited by examiner

INTEGRATED ELECTRO-HYDRAULIC UNIT

FIELD OF THE INVENTION

The present disclosure relates to an electric and hydraulic machine. More particularly, the present disclosure relates to an integrated electro-hydraulic unit.

BACKGROUND OF THE INVENTION

Electrically driven hydraulic pumps, commonly referred to as ePumps, have been pushed towards the development of effective cooling solutions for electric machines. Conventionally, electric machines are cooled using a fluid that is separate from a working fluid of the hydraulic pump. In some instances, the electric machine is integrated with the hydraulic machine, known as the integrated electro-hydraulic unit, in a single embodiment to increase the power to weight ratio. However, the conventional methods of cooling an electric machine are more difficult in the integrated electro-hydraulic unit configuration. Therefore, it may be more desirable to use the working fluid of the hydraulic machine to accomplish cooling functions.

In the state of the art, the solutions for cooling can be classified in the following categories: solutions that use the working fluid after being pressurized by the pump, solutions that use the returning flow of the working fluid, and solutions that use internal leakage flow.

Despite accomplishing the cooling function, each of the solutions above have disadvantages. Solutions that use the working fluid after being pressurized by the pump affect the volumetric efficiency of the hydraulic machine. Volumetric efficiency is the ratio of actual flow rate to the theoretical discharge flow rate. The volumetric efficiency decreases because of a portion of the flow being used for the cooling function. Solutions that use the returning flow impose restrictions on a circuit layout and on the hydraulic machine design (for example, in some hydraulic circuits the return flow is not related to the hydraulic machine flow). Solutions that use internal leakage flow provide insufficient flow to properly cool the electric machine and are more prone to contamination.

SUMMARY OF THE INVENTION

The present invention provides, in one aspect, an integrated electro-hydraulic unit including a hydraulic machine having a shaft and a cylinder block coupled to the shaft. The shaft is configured to rotate around a central axis. The cylinder block includes a plurality of pistons within the cylinder block. The cylinder block is configured to rotate about the central axis to generate reciprocating movement of each of the plurality of pistons. The cylinder block includes a distal portion spaced from the central axis. The distal portion includes an axial span measured parallel to the central axis between first and second axial ends of the distal portion. The integrated electro-hydraulic unit includes an electric machine having a stator and a rotor comprising a plurality of rotor plates. The rotor includes an axial span measured parallel to the central axis between first and second axial ends of the rotor. The axial span of the rotor is larger than the axial span of the distal portion of the cylinder block. The integrated electro-hydraulic unit includes a drive flange situated radially outside the cylinder block and radially within the rotor to define an interface between the distal portion of the cylinder block and the rotor. The plurality of stacked plates is secured to a rotor-receiving exterior portion of the drive flange and the distal portion of the cylinder block is secured to a cylinder block-receiving interior portion of the drive flange. The axial span of the distal portion of the cylinder block extends outside the axial span of the rotor.

The present invention provides, in another aspect, an integrated electro-hydraulic unit including a hydraulic machine having a shaft and a cylinder block coupled to the shaft. The shaft is configured to rotate around a central axis. The cylinder block includes a plurality of pistons within the cylinder block. The cylinder block is configured to rotate about the central axis to generate reciprocating movement of each of the plurality of pistons. The cylinder block includes a distal portion spaced from the central axis. The distal portion includes an axial span measured parallel to the central axis between first and second axial ends of the distal portion. The integrated electro-hydraulic unit includes an electric machine having a stator and a rotor comprising a plurality of rotor plates. The rotor includes an axial span measured parallel to the central axis between first and second axial ends of the rotor. The integrated electro-hydraulic unit includes a drive flange situated radially outside the cylinder block and radially within the rotor to define an interface between the cylinder block and the rotor. The plurality of stacked plates is secured to a rotor-receiving exterior portion of the drive flange and the distal portion of the cylinder block is secured to a cylinder block-receiving interior portion of the drive flange. The first end of the distal portion of the cylinder block lies axially within the axial span of the rotor and the second end of the distal portion of the cylinder block lies axially outside the axial span of the rotor such that only a portion of the axial span of the distal portion of the cylinder block overlaps the axial span of the rotor.

DETAILED DESCRIPTION

Figure 1:
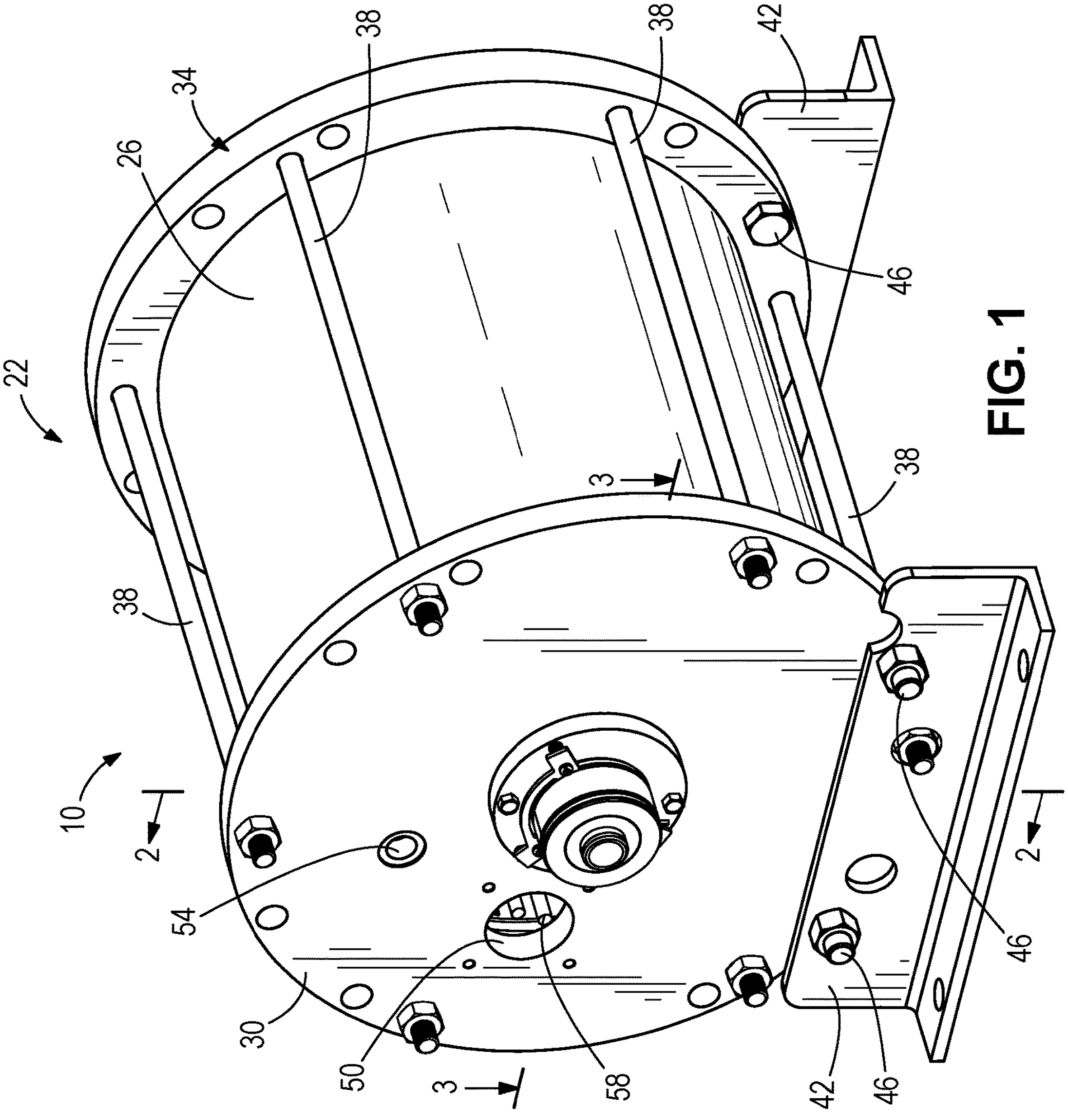
FIG. 1 is a perspective view of an integrated electro-hydraulic unit.
Figure 2:
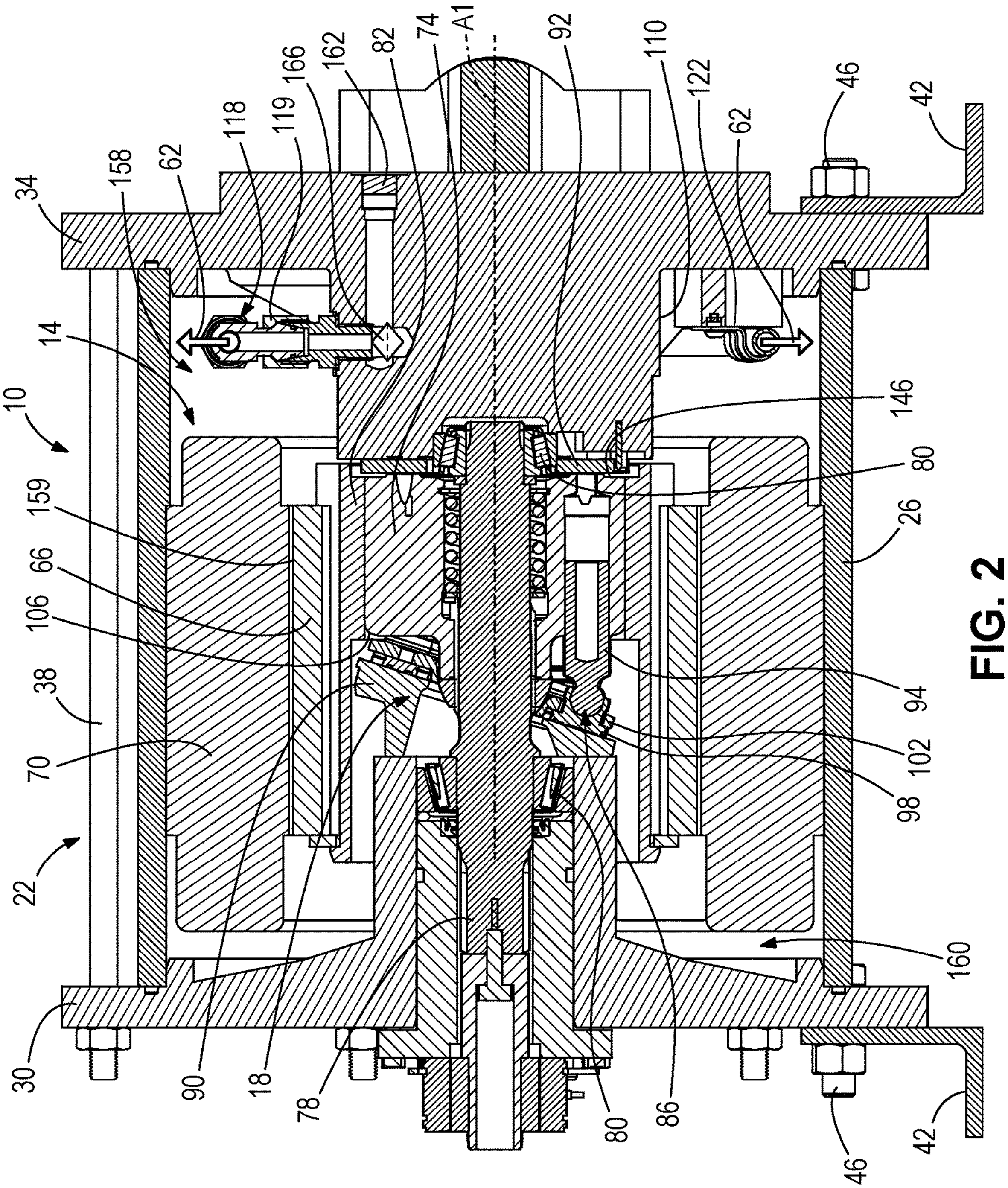
FIG. 2 is a longitudinal cross-section of the integrated electro-hydraulic unit taken along line 2-2 of FIG. 1.
Figure 3:
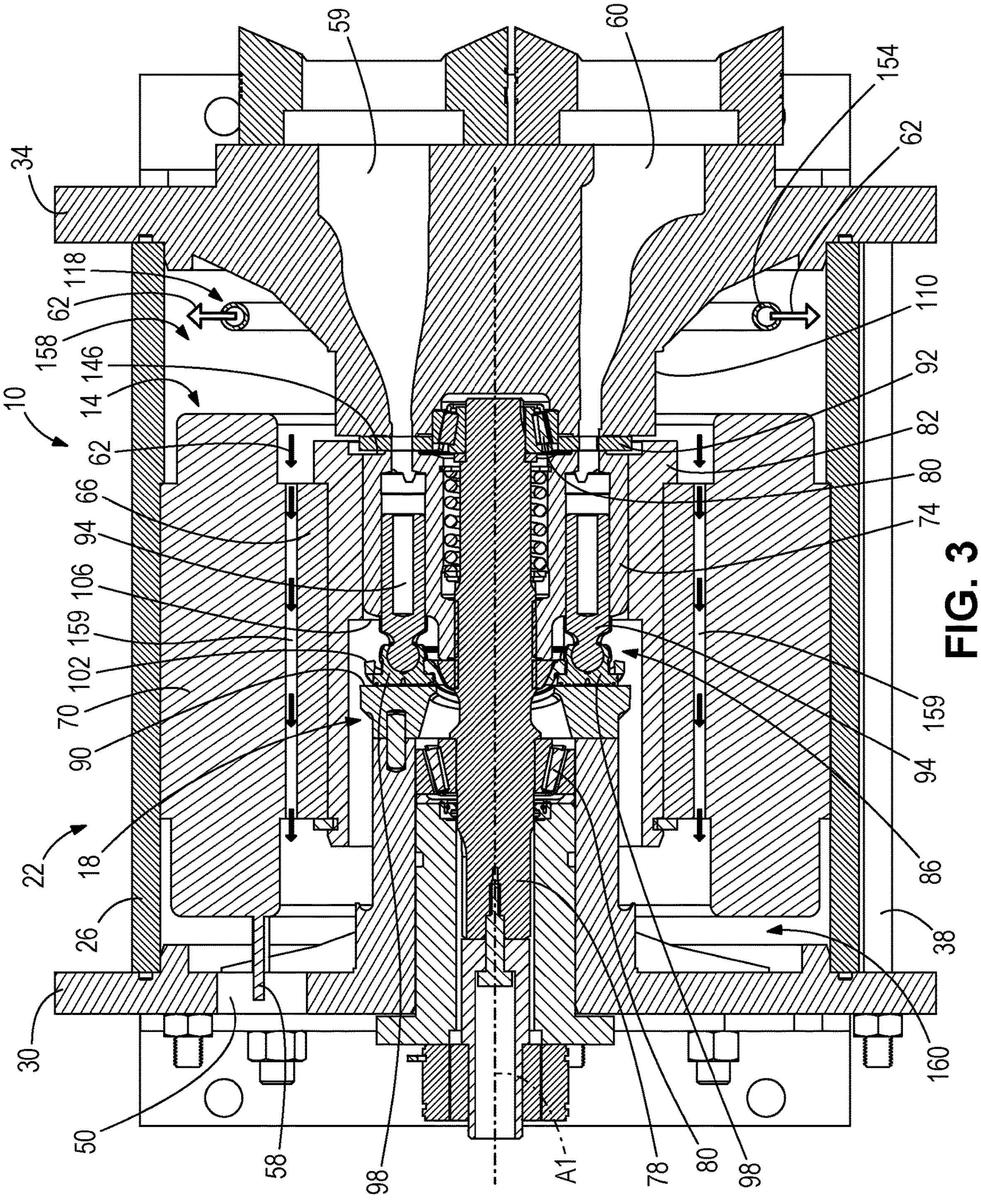
FIG. 3 is a longitudinal cross-section of the integrated electro-hydraulic unit taken along line 3-3 of FIG. 1.
Figure 11:
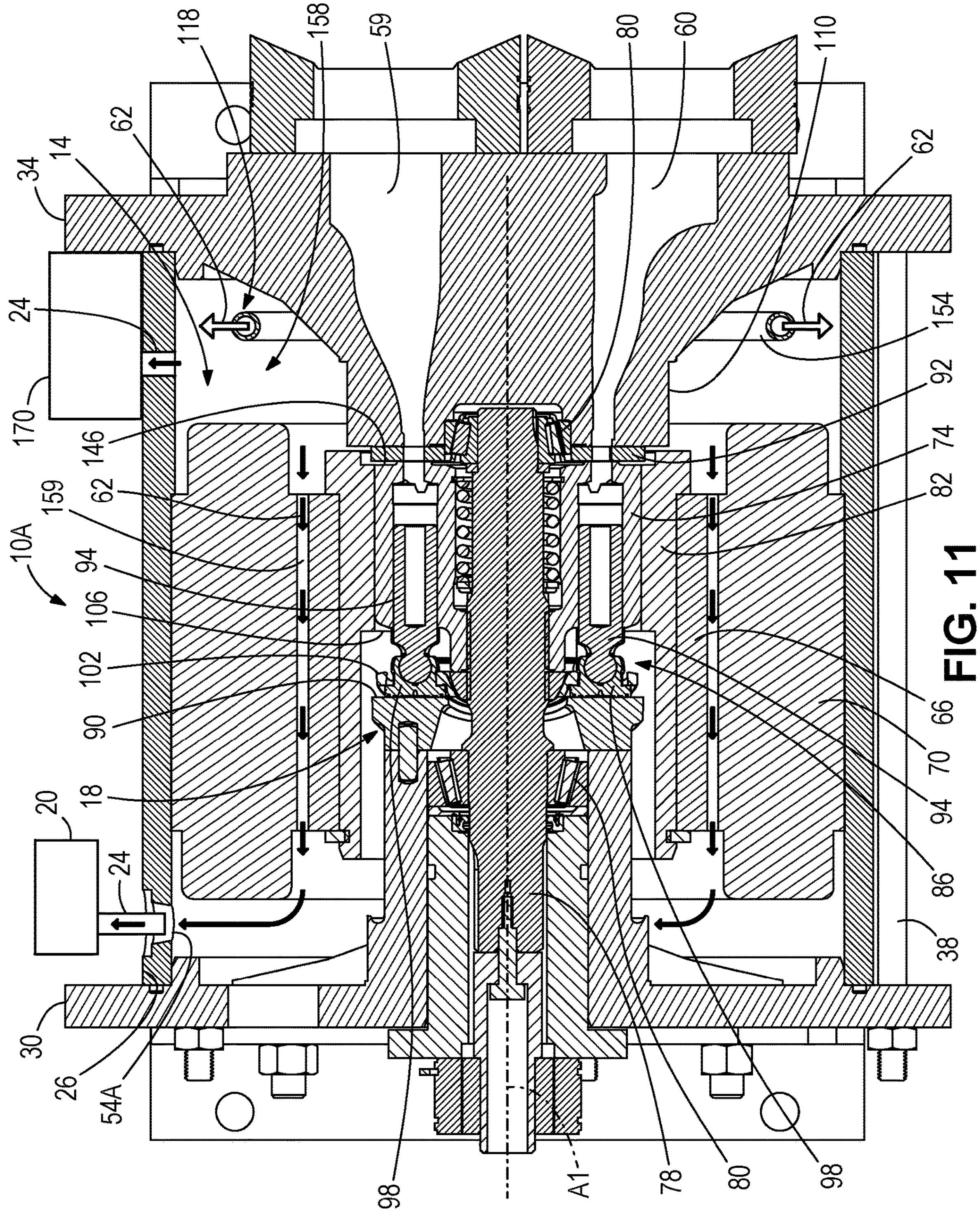
FIG. 11 is a longitudinal cross-section of an alternate embodiment of the integrated electro-hydraulic unit along line 3-3 of FIG. 1 showing additional electrical components and additional hydraulic units connected therewith.

FIGS. 1-4 illustrate an integrated electro-hydraulic unit 10 according to one construction of the present disclosure. The integrated electro-hydraulic unit 10 includes an electric machine 14, a hydraulic machine 18, and a casing 22 as illustrated in FIG. 2. The casing 22 includes a radial casing 26, a swashplate end case 30, and a porting end case 34. Fasteners 38 extend transverse to the end cases 30, 34 and parallel to a shared rotational axis A1 of the electric machine 14 and the hydraulic machine 18. The fasteners 38 secure the swashplate end case 30 and the porting end case 34 to each other with the radial casing 26 therebetween. Thus, the casing 22 forms a singular shared interior cavity for both the electric machine 14 and the hydraulic machine 18 as discussed in further detail below. The casing 22 is fastened to mounts 42 by using fasteners 46 on the swashplate end case 30 and the porting end case 34. The swashplate end case 30 includes an electrical connection aperture 50 and in some embodiments, a drain port 54. In other embodiments, the drain port 54 is included in the radial casing 26 as shown in FIG. 11. The electrical connection aperture 50 accommodates the routing of wires 58 to the electric machine 14. The wires 58 are used to provide power to the electric machine 14. The porting end case 34 includes a first opening 59 and a second opening 60 as illustrated in FIG. 3.

The integrated electro-hydraulic unit 10 integrates the electric machine 14 and the hydraulic machine 18 such that they can interchangeably transfer mechanical power into fluid power known as pumping. The electric machine 14 can be a motor of any suitable topology including, but not limited to, induction, surface permanent magnet, internal permanent magnet, wound rotor, and switched reluctance. The hydraulic machine 18 can be an axial piston machine of swashplate type (as illustrated) or a bent axis pump, which operates on the same principles but lacks a movable swashplate. The casing 22 is a shared casing that collectively surrounds the electric machine 14 and the hydraulic machine 18. As shown in FIG. 2, the hydraulic machine 18 is nested within the electric machine 14 such that the electric machine 14 encircles the hydraulic machine 18. Within the casing 22, there is a space 158 between the porting end case 34 and adjacent to the end of the electric machine 14 as shown in FIG. 2. A cooling pipe 118 is provided within the space 158. A cooling flow 62 of the working fluid processed by the hydraulic machine 18 exits the cooling pipe 118 into the space 158. The cooling flow 62 enters a cooling channel 159 which is defined between the electric machine 14 and the hydraulic machine 18 and flows towards a space 160 between the swashplate end case and adjacent to the front of the electric machine 14 as shown in FIG. 3. The casing 22 fluidly seals the electric machine 14 and the hydraulic machine 18. In one embodiment, the first opening 59, the second opening 60, and the drain port 54 are the only locations where the working fluid can enter and leave the casing 22.

Other configurations of the integrated electro-hydraulic unit 10 may include an additional integrated electro-hydraulic unit 20 having a casing separate from the integrated electro-hydraulic unit 10 and use a connector 24 to transfer a cooling flow 62 to the additional integrated electro-hydraulic unit 20 as shown in FIG. 11. In other embodiments, multiple electro-hydraulic units can be stacked together on a common shaft or in the same casing 22. Stacked electro-hydraulic units work with a single inverter which reduces the cooling demands in stacked electro-hydraulic unit architectures.

As shown in FIG. 2, the electric machine 14 includes a rotor 66 and a stator 70 with a winding. The stator 70 is located most proximal to the radial casing 26 of the shared casing 22. The rotor 66 is located radially inward towards the axis A1 from the stator 70. Both the rotor 66 and the stator 70 encircle the hydraulic machine 18. As illustrated in FIG. 2, the electric machine 14 and hydraulic machine 18 are configured for immersion cooling with the cooling flow 62. With immersion cooling, the space 158 and 160 within the casing 22 that accommodates the electric machine 14 and the hydraulic machine 18 is substantially filled with the working fluid, which moves continuously through the integrated electro-hydraulic unit 10 to form the cooling flow 62.

Figure 4:
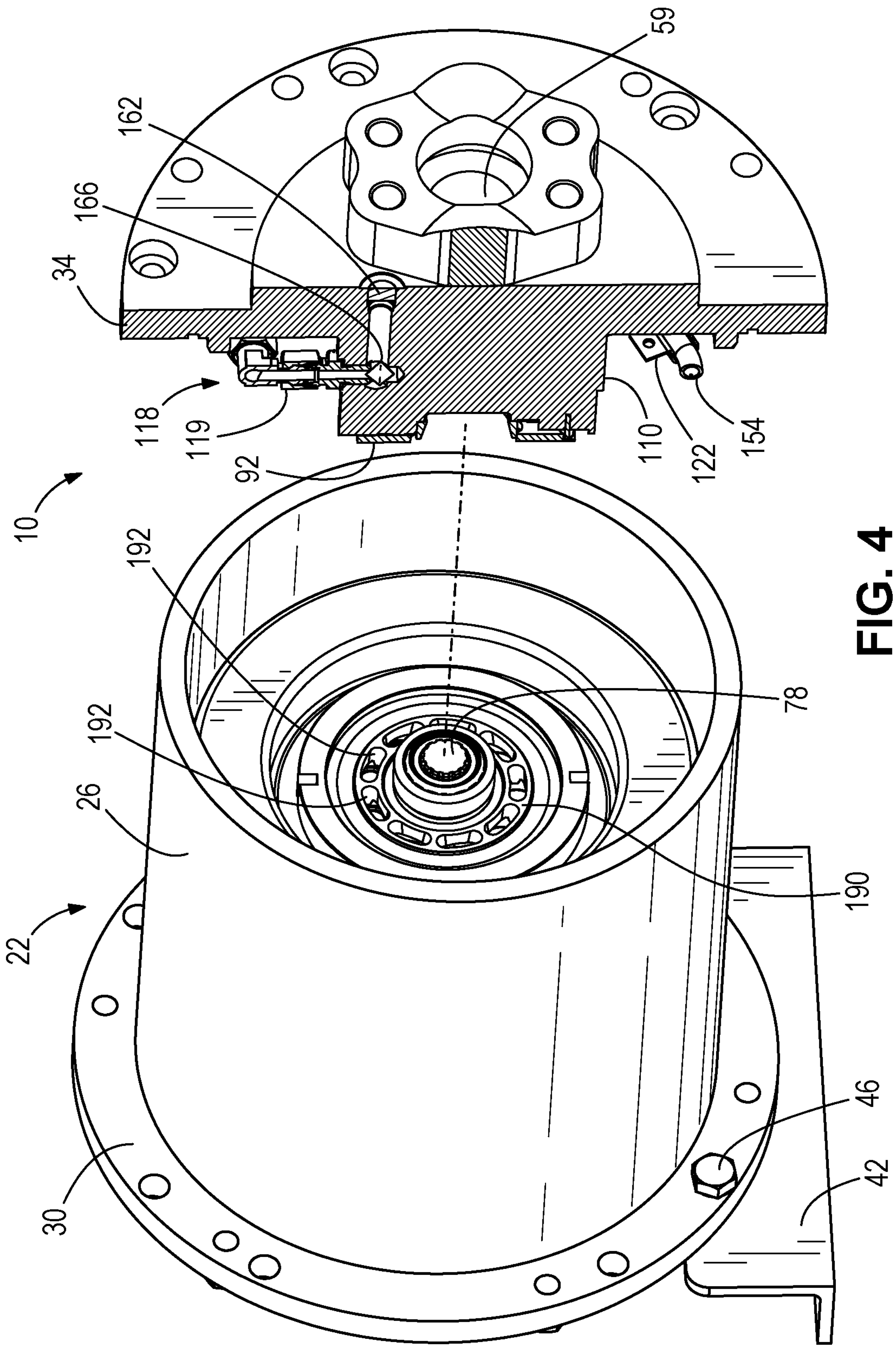
FIG. 4 is a perspective view of the integrated electro-hydraulic unit of FIG. 1 with a porting end case removed from a shared casing and sectioned.
Figure 16:
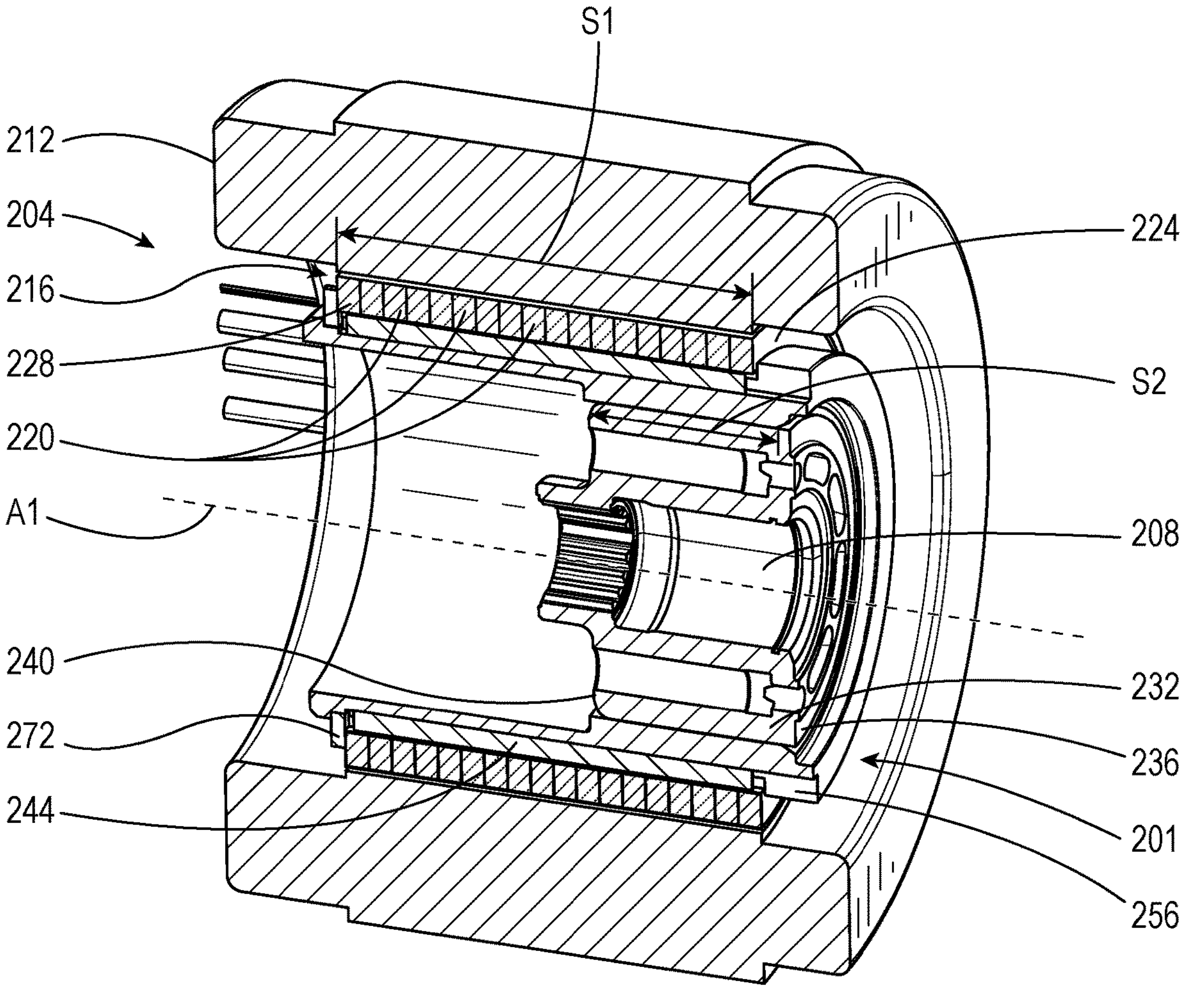
FIG. 16 is a longitudinal cross-section of the integrated electro-hydraulic unit taken along line 16-16 of FIG. 15 showing an embodiment of an electric machine, a drive flange, and a cylinder block.

In some embodiments, as shown in FIG. 3, the hydraulic machine 18 may be an axial piston machine of swashplate type. The hydraulic machine 18 includes a rotary working group 86 to operate on the working fluid. The rotary group 86 includes a cylinder block 74, a shaft 78, a drive flange 82, a swashplate 90, a plurality of pistons 94, a plurality of slippers 98, a retaining plate 102 and a valve plate 92. The cylinder block 74 is rotatably supported by the shaft 78 about the axis A1 on bearings 80. The cylinder block 74 is rotatable about the axis A1 in a first rotational direction R1. The cylinder block 74 has a first end 106 proximal to the swashplate end case 30 and a second end 146 proximal to the porting end case 34. The cylinder block 74 includes a cylinder block end 190 on the second end 146 as shown in FIG. 4. The cylinder block end 190 includes a plurality of slots 192 circumferentially located around the axis A1. The drive flange 82 is located between the cylinder block 74 and the rotor 66 and rotatably couples the cylinder block 74 to the rotor 66. The swashplate 90 is located along the axis A1 and is in contact with the plurality of slippers 98 towards the first end 106 of the cylinder block 74. The plurality of pistons 94 are received in the cylinder block 74 radially around the axis A1. The valve plate 92 is located along the axis A1 and between the cylinder block end 190 of the cylinder block 74 and the porting end case 34 as best shown in FIG. 4. The porting end case 34 has a protrusion 110 that extends towards the second end 146 of the cylinder block 74. The protrusion 110 contacts the valve plate 92 and includes the first opening 59, the second opening 60, and a third passage 114 which are all in communication with the valve plate 92 as shown in FIGS. 3 and 16.

Figure 14:
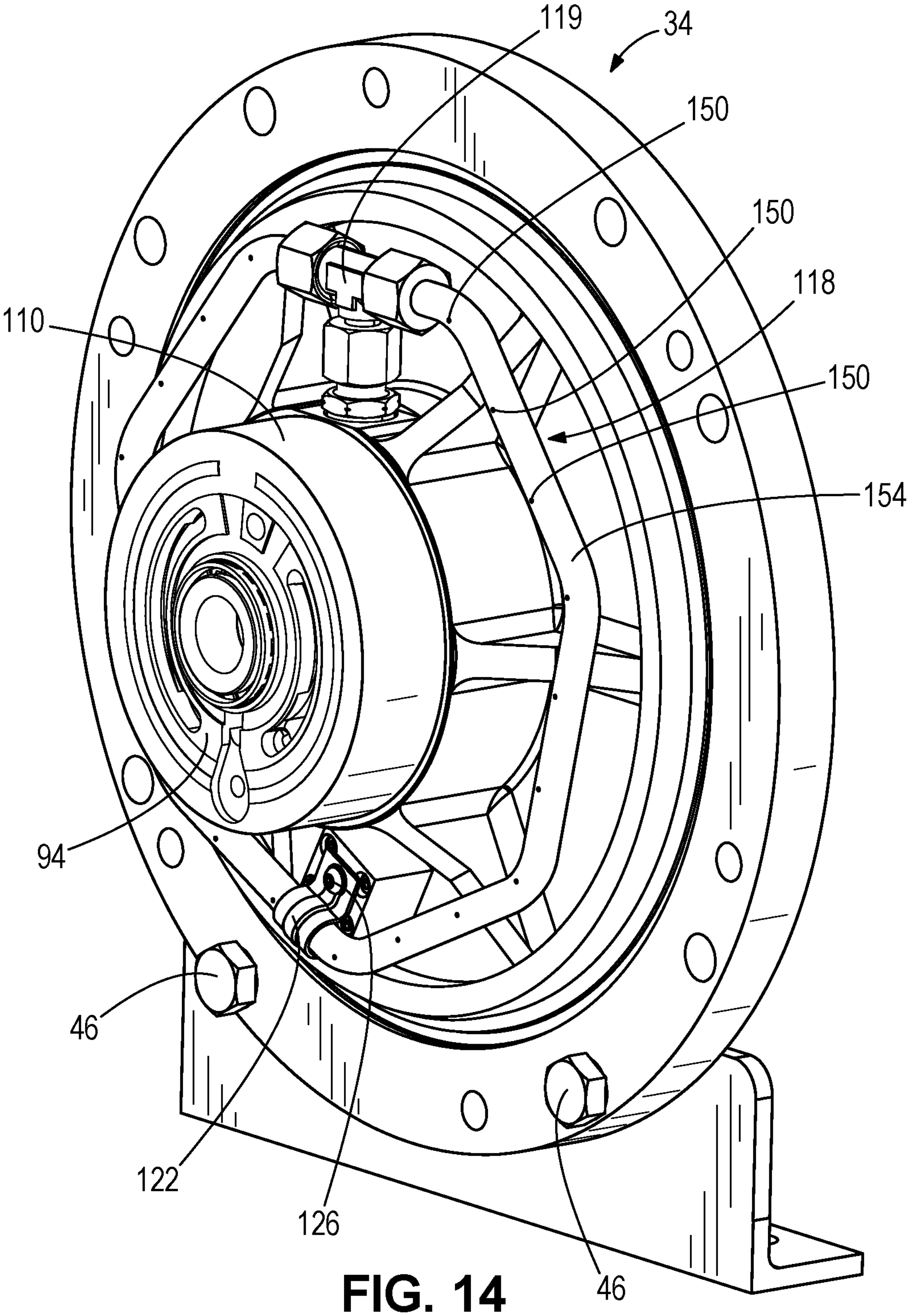
FIG. 14 is a perspective view of the porting end case for the integrated electro-hydraulic unit.

The porting end case 34 includes the cooling pipe 118 surrounding the axis A1. The cooling pipe 118 can have any suitable geometry including, but not limited to, linear segments, arcuate segments, or as illustrated in FIG. 14 the cooling pipe 118 can have seven linear segments forming a heptagonal shape. The cooling pipe 118 is connected with a fitting 119 to the protrusion 110 of the porting end case 34 as shown in FIG. 4. In the illustrated embodiment, the fitting 119 is a "T" fitting. The cooling pipe 118 incudes a wall or surface 154 with a plurality of apertures 150. The apertures 150 are distributed (e.g. evenly) along the length of the cooling pipe 118. As shown in FIG. 14, the cooling pipe 118 can have ten or more apertures 150 (e.g., twenty of the apertures 150). In some instances, the cooling pipe 118 is secured at one or more locations to the porting end case 34 (e.g., with a bracket or retainer 122 and a fastener 126 as shown in FIG. 14) and is in fluid communication with the third passage 114 by the fitting 119 as shown in FIG. 2. The apertures 150 can be evenly distributed about the length of the cooling pipe 118. The cooling pipe 118 directs the cooling flow 62 into the space 158 through the plurality of apertures 150.

Figure 5:
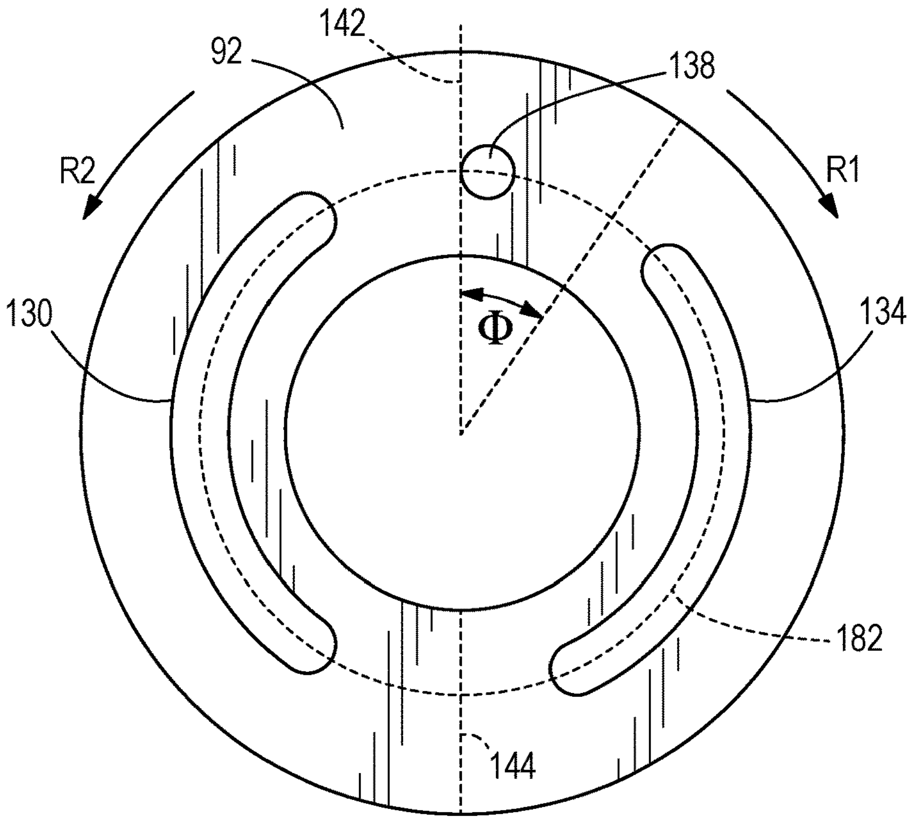
FIG. 5 is an end view of an embodiment of a valve plate of the integrated electro-hydraulic unit including a third port.
Figure 12:
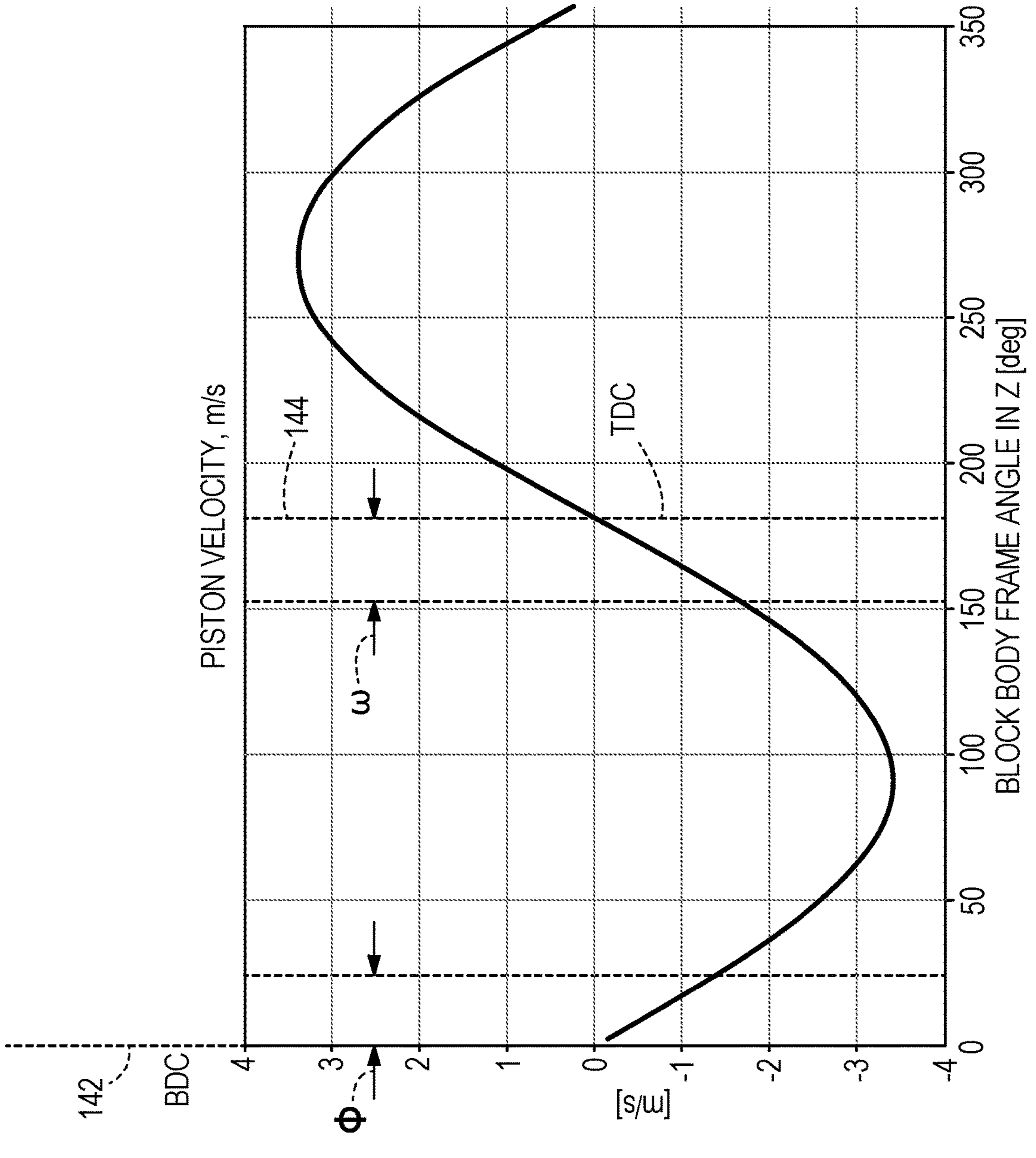
FIG. 12 is a diagram of piston velocity with a first rotational position line.

In some embodiments, the valve plate 92 includes a first port 130, a second port 134 and a third port 138 as shown in FIG. 5. The second port 134 is reduced in cross-sectional area with respect to the first port 130 to accommodate for the third port 138. The center of the third port 138 is located within a first angular span Φ on the valve plate 92 past a first rotational position line 142. The first rotational position line 142 corresponds to a bottom dead center as shown in FIGS. 5 and 12. The first angular span Φ, in some instances, is 25 degrees. By strategically positioning the third port 138 on the valve plate 92, the velocity of the plurality of pistons 94 at that location is low comparatively to the maximum velocity of the plurality of pistons 94 as illustrated in FIG. 12. Flow rate of the working fluid displaced by the plurality of pistons 94 is directly related to the velocity of the plurality of pistons 94. The low velocity of the plurality of pistons 94 within the first angular span Φ corresponds to a low flow rate of the working fluid used for the cooling fluid 62. The low flow rate of the working fluid is desirable for the cooling flow 62 because it results in a smaller disturbance of overall fluid flow in the integrated electro-hydraulic unit 10. As shown in FIG. 5, the third port 138 is located near the bottom dead center, BDC, which correlates to a relatively low piston velocity region and therefore a low flow rate of the working fluid used for the cooling flow 62. The valve plate 92 is used with the cylinder block end 190 as illustrated in FIG. 4. The cylinder block end 190 includes the plurality of slots 192 as described above with each of the slots being identical shapes.

Figure 10:
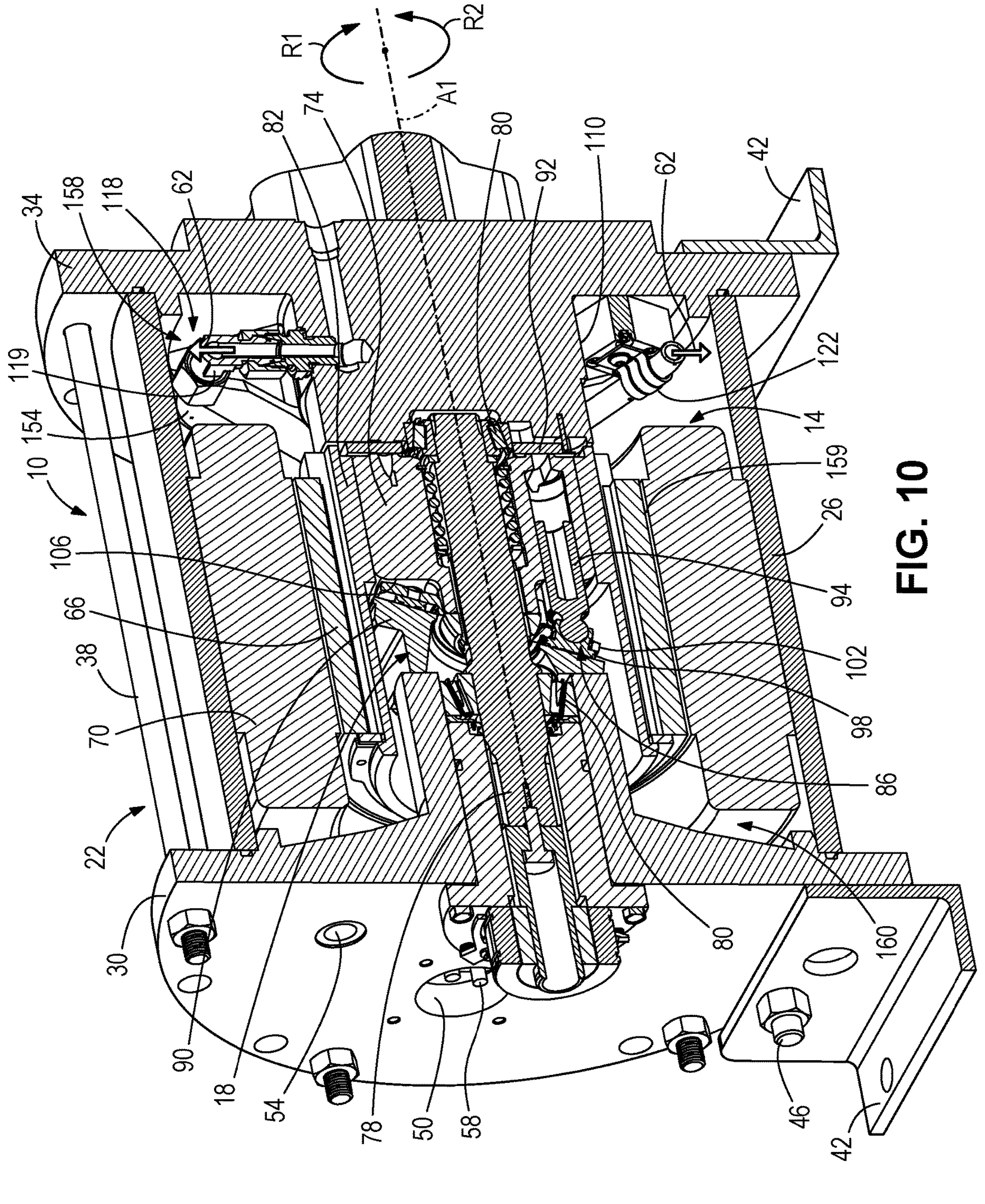
FIG. 10 is a sectioned perspective view of the integrated electro-hydraulic unit of FIG. 2 labeled with first and second rotational directions.

The cylinder block 74 is configured to rotate clockwise around the axis A1 in the first rotational direction R1 as shown in FIG. 10. During movement in the first rotational direction R1 of the cylinder block 74, each of the plurality of pistons 94 move in a reciprocating movement from the second end 146 of the cylinder block, known as a top dead center, towards the first end 106 of the cylinder block 74, known as the bottom dead center. As each of the plurality of pistons 94 moves away from the top dead center towards the bottom dead center during the first rotational direction R1, each of the plurality of pistons 94 pulls the working fluid through the first port 130 and into the cylinder block 74. As each of the plurality of pistons 94 moves away from the bottom dead center and towards the top dead center, each of the plurality of pistons 94 pushes the working fluid out of the cylinder block 74. A first portion of the pumped working fluid is pushed out of the rotary working group 86 through the second port 134. A second portion of the pumped working fluid, the cooling flow 62, is pushed out of the rotary working group 86 through the third port 138 of the valve plate 92, separate from the first portion at the second port 134 (e.g., not mixed or conjoined together therewith). The working fluid received by the third port 138 is used as the cooling flow 62 for the integrated electro-hydraulic unit 10. As mentioned briefly above, the cooling flow 62 through the third port 138 is separate from the first port 130 and the second port 134 such that the volumetric efficiency measured between the first port 130 and the second port 134 is not affected by the cooling flow 62.

After the cooling flow 62 is pushed through the third port 138 on the valve plate 92, it flows through the porting end case 34 and into the cooling pipe 118 as shown in FIG. 2. However, in some embodiments the porting end case 34 does not direct the cooling flow 62 to the cooling pipe 118. For instance, the cooling pipe 118, or the fitting 119 can be directly plugged into the third port 138. Before the cooling flow 62 passes out of the cooling pipe 118, the cooling flow 62 can be filtered by a magnetic fitting 162 or a net filter 166 to remove particles from the cooling flow 62 as shown in FIG. 2. In some instances, the magnetic fitting 162 or net filter 166 can be placed in the porting end case 34 for access if the components needed to be replaced. Benefits of the magnetic fitting 162 and the net filter 166 include preventing a blockage or clogging of the plurality of apertures 150. The cooling flow 62 is discharged from the cooling pipe 118 through the plurality of apertures 150 on the surface 154. The cooling flow 62 exits the plurality of apertures 150 and into the space 158. The cooling flow 62 passes through the cooling channel 159 between the electric machine 14 and the hydraulic machine 18 and into the space 160. The cooling flow 62 is discharged out of the drain port 54. In other embodiments, a similar cooling channel is formed in an integrated electro-hydraulic unit 10A but it moves through a drain port 54A on the radial casing 26 as illustrated in FIG. 11. The cooling flow can also be used to cool additional electronic components 170 as shown in in FIG. 11. The additional electronic components 170 can include an inverter and/or an electronic controller, among other things.

In addition to pumping, the integrated electro-hydraulic unit 10 can also transfer the fluid power into mechanical power. In other words, the hydraulic machine, or "pump," has the capability of pumping, but also the capability of motoring. The capability of switching between pumping and motoring is possible by reversing a rotational direction of the electric machine 14. A unit capable of pumping and motoring is commonly referred to as a two-quadrant unit in the art.

Figure 13:
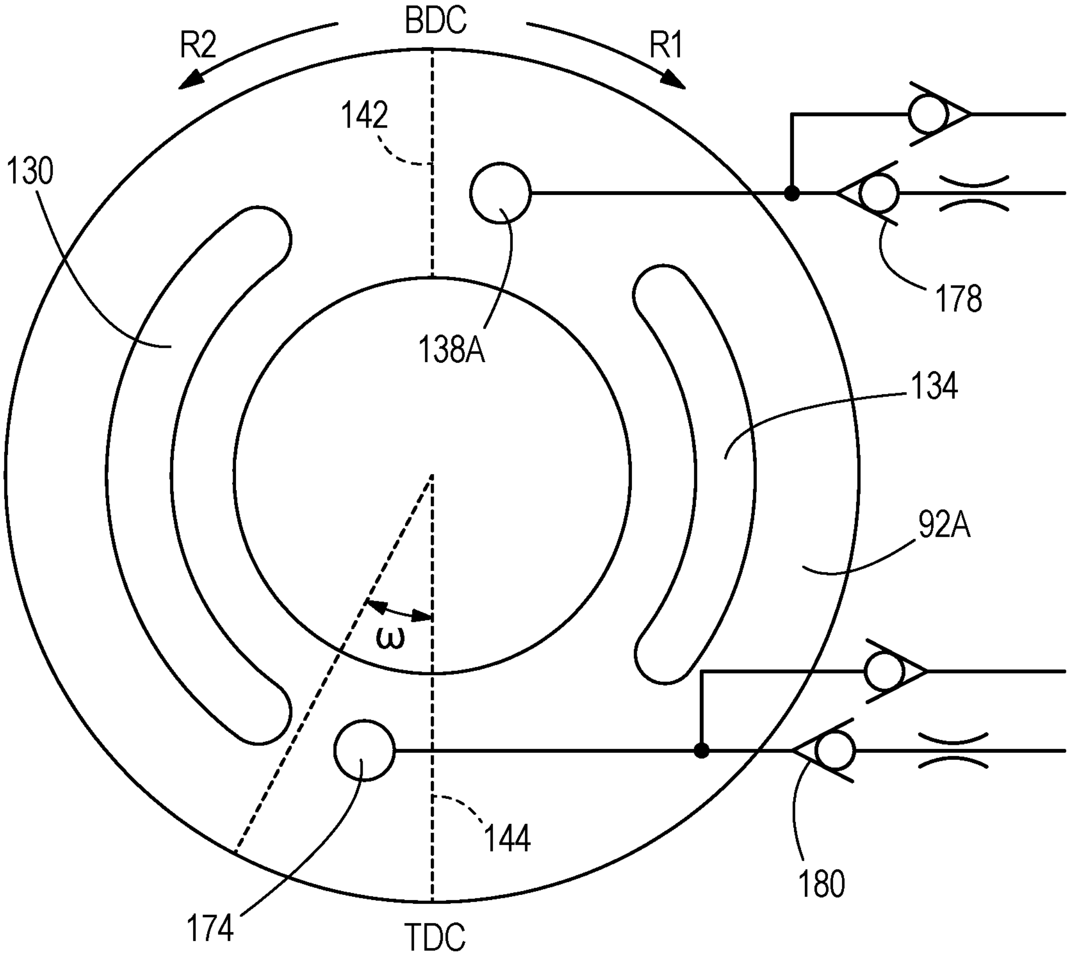
FIG. 13 is a schematic-detailed end view of an embodiment of the valve plate including the third port and the fourth port with check valves.

FIG. 13 shows an alternate embodiment of a valve plate 92A for use with the rotary group 86 including a fourth port 174. The fourth port 174 permits cooling when the shaft 78 and the cylinder block 74 rotate counterclockwise around the axis A1 in a second rotational direction R2, also referred to as motoring. As shown in FIGS. 12 and 13, the center of the fourth port 174 is located within a second angular span ω on the valve plate 92A prior to a second rotational position line 144. The second rotational position line 144 corresponds to the top dead center. The second angular span ω, in some instances, is 25 degrees. In FIG. 10, the shaft 78 and the cylinder block 74 are rotated counterclockwise around the axis A1 in the second rotational direction R2. As each of the plurality of pistons 94 moves away from the top dead center and towards the bottom dead center during rotation of the cylinder block 74, each of the plurality of pistons 94 pulls the working fluid through the second port 134 and into the cylinder block 74. To prevent the working fluid from being pulled thorough the third port 138A during motoring, a check valve 178 in fluid communication with the third port 138A prevents the flow as shown in FIG. 13. As each of the plurality of pistons 94 moves away from the bottom dead center and towards the top dead center during the second rotational direction R2, each of the plurality of pistons 94 pushes the working fluid out of the cylinder block 74. A third portion of the working fluid is pushed out of the rotary group 86 though the first port 130. A fourth portion of the working fluid is pushed out of the rotary group 86 though the fourth port 174 of the valve plate 92A, separate from the third portion at the first port 130 (e.g., not mixed or conjoined together therewith). The working fluid received by the fourth port 174 is used as the cooling flow 62 for the integrated electro-hydraulic unit 10. As mentioned briefly above, the cooling flow 62 through the fourth port 174 is separate from the first port 130 and the second port 134 such that the volumetric efficiency measured between the first port 130 and the second port 134 is not affected by the cooling flow 62. To prevent the working fluid from being pulled thorough the fourth port 174 during pumping, a check valve 180 in fluid communication with the fourth port 174 prevents the flow as shown in FIG. 13.

In summary, placing a third port 138 on the valve plate 92 in the span from bottom dead center to top dead center permits the cooling flow 62 for the first rotational direction R1 of the cylinder block 74. Consequently, placing a fourth port 174 on the valve plate 92 in the span from bottom dead center to top dead center permits the cooling flow 62 during the second rotational direction R2 of the cylinder block 74.

Figure 6:
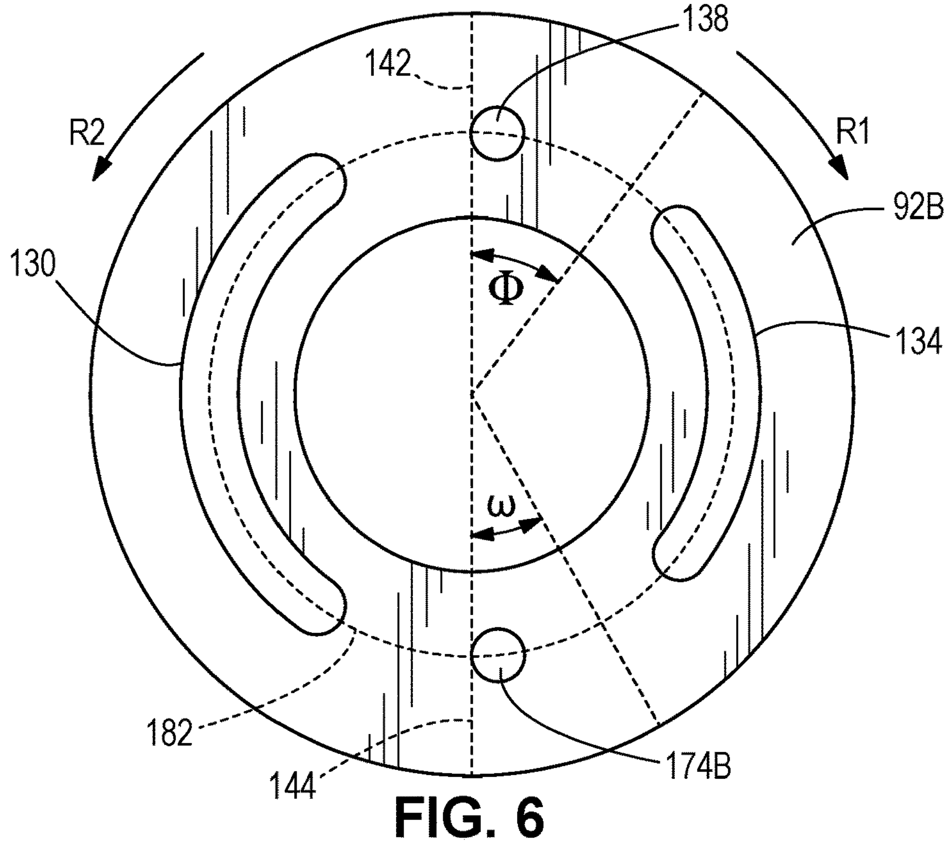
FIG. 6 is an end view of an embodiment of the valve plate of the integrated electro-hydraulic unit including a fourth port.

FIG. 6 shows an alternate embodiment of a valve plate 92B for use with the rotary group 86 including a fourth port 174B. The center of the fourth port 174B is located within the second angular span ω on the valve plate prior to the second rotational position line 144 as shown in FIGS. 6 and 12. Unlike the fourth port 174, the fourth port 174B cannot provide the cooling flow 62 in motoring because it is located within the same radial span from top dead center to bottom dead center as the third port 138 of FIG. 6. Rather, the fourth port 174B contributes to the cooling flow 62 in circumstances where a greater cooling capacity is needed. As mentioned previously, the velocity of the plurality of the pistons 94 within the first and second angular span Φ, ω is low compared to the maximum velocity of the plurality of pistons 94 and therefore corresponds to a lower flow rate of the working fluid. The low flow rate of the working fluid results in a smaller disturbance of the overall fluid flow in the integrated electro-hydraulic unit 10. Additionally, the plurality of pistons 94 displace the working fluid and create pressure differences within the cylinder block 74. The pressure differences within the cylinder block 74 affect the tilting moments of the cylinder block 74. By adding the center of the fourth port 174B within the second angular span ω, it balances the cylinder block 74 by counteracting the effect of the third port 138 has on the pressure differences within the cylinder block 74. Therefore, the effect of pressure on the cylinder block 74 tilting moments is mitigated.

Figure 7:
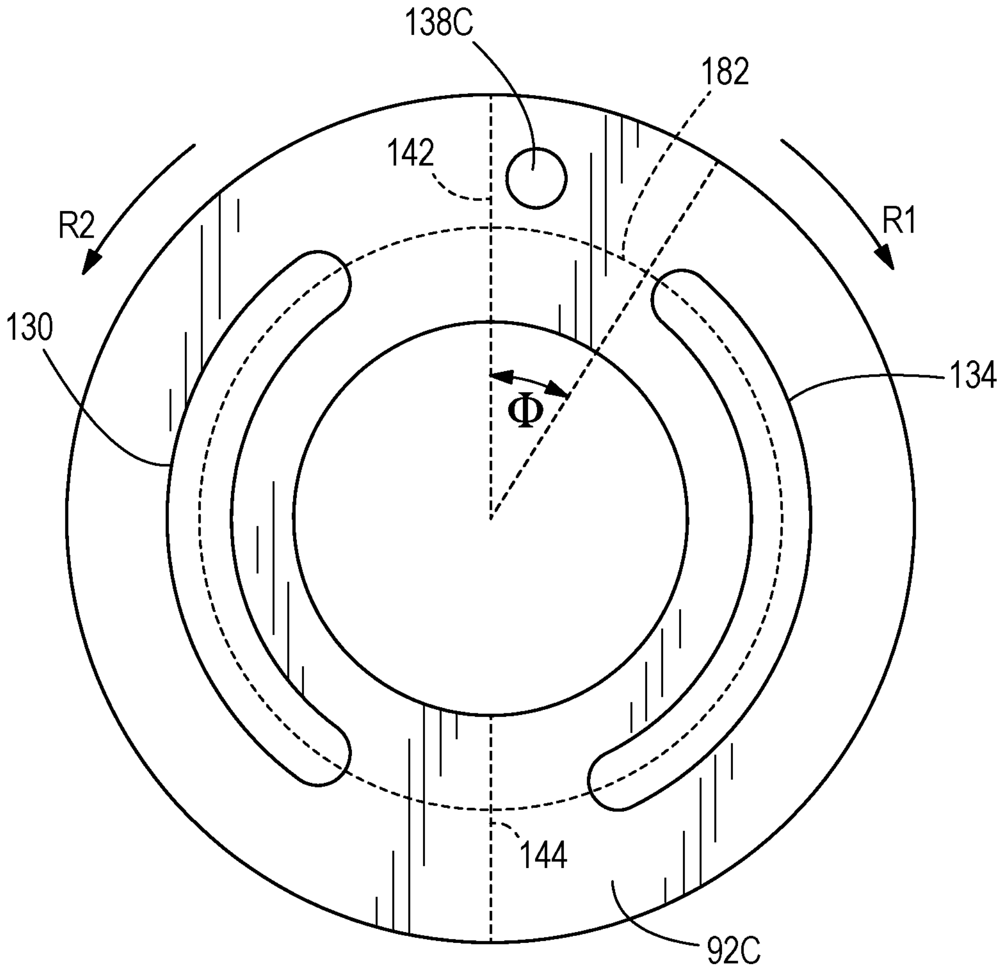
FIG. 7 is an end view of an embodiment of the valve plate of the integrated electro-hydraulic unit including an offset third port.

FIG. 7 shows an alternate embodiment of a valve plate 92C for use with the rotary group 86 including a third port 138C located at a radial location offset (outwardly) from the pitch circle 182 of the first port 130 and the second port 134. The center of the third port 138C is located within the first angular span Φ on the valve plate 92C past the first rotational position line 142 as shown in FIGS. 7 and 12. The valve plate 92C works with a different embodiment of the cylinder block end 190. The plate compatible with the valve plate 92C would consist of slots with the shape of an overlay between the slots 190 and the third port 138C. The plurality of slots are shaped differently than the plurality of slots 190 to accommodate for the offset radial location of 138C. The alternate location for the third port 138C enables the cooling flow 62 to be more easily controlled because the area of the third port 138C in communication with the plurality of the slots 192C of the cylinder block end 190C is reduced compared to the third port 138 used with the cylinder block end 190. In other words, the overlapping span between the slots 192C and the third port 138C can be smaller in relation to the overlapping span of cylinder block end 190 and the third port 138. Additionally, the pressures within the cylinder block 74 are constant due to the slots being similar shapes.

Figure 8A:
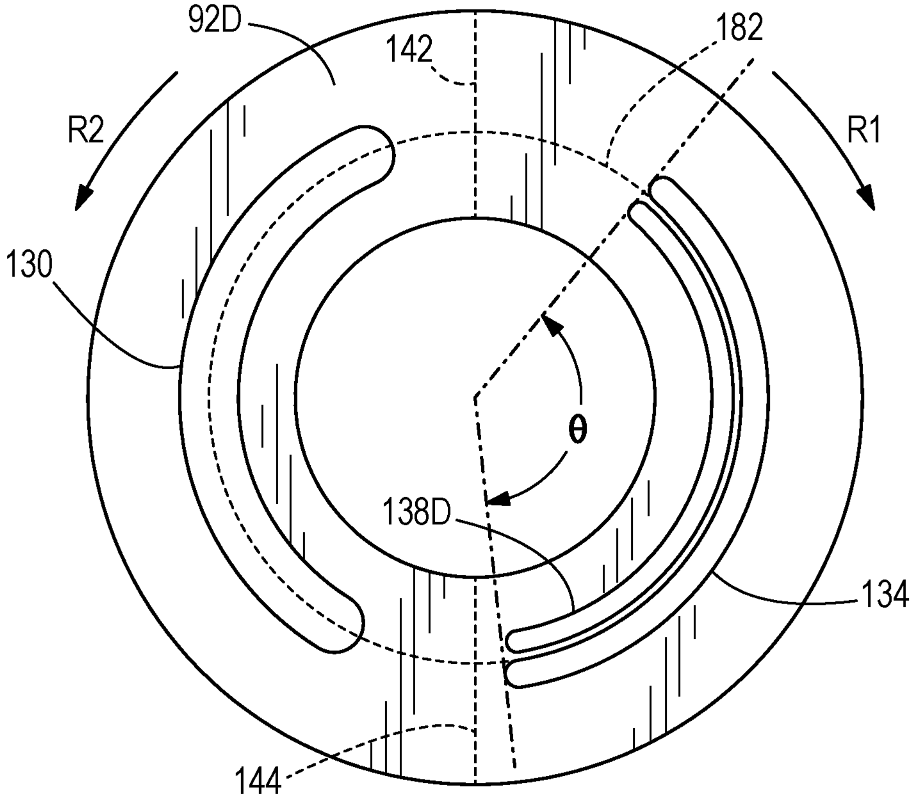
FIG. 8A is an end view of an embodiment of the valve plate of the integrated electro-hydraulic unit including the offset third port.
Figure 9B:
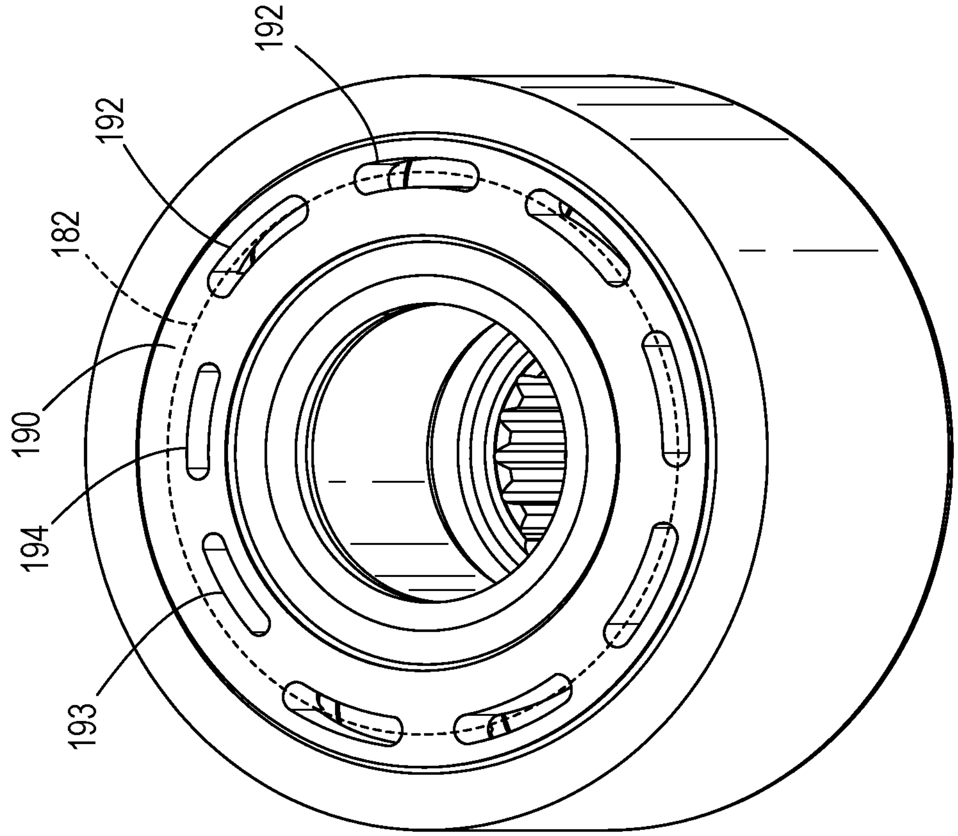
FIG. 9B is a perspective view of an embodiment a plate for use with the valve plate of FIG. 8A or FIG. 8B.
Figure 9A:
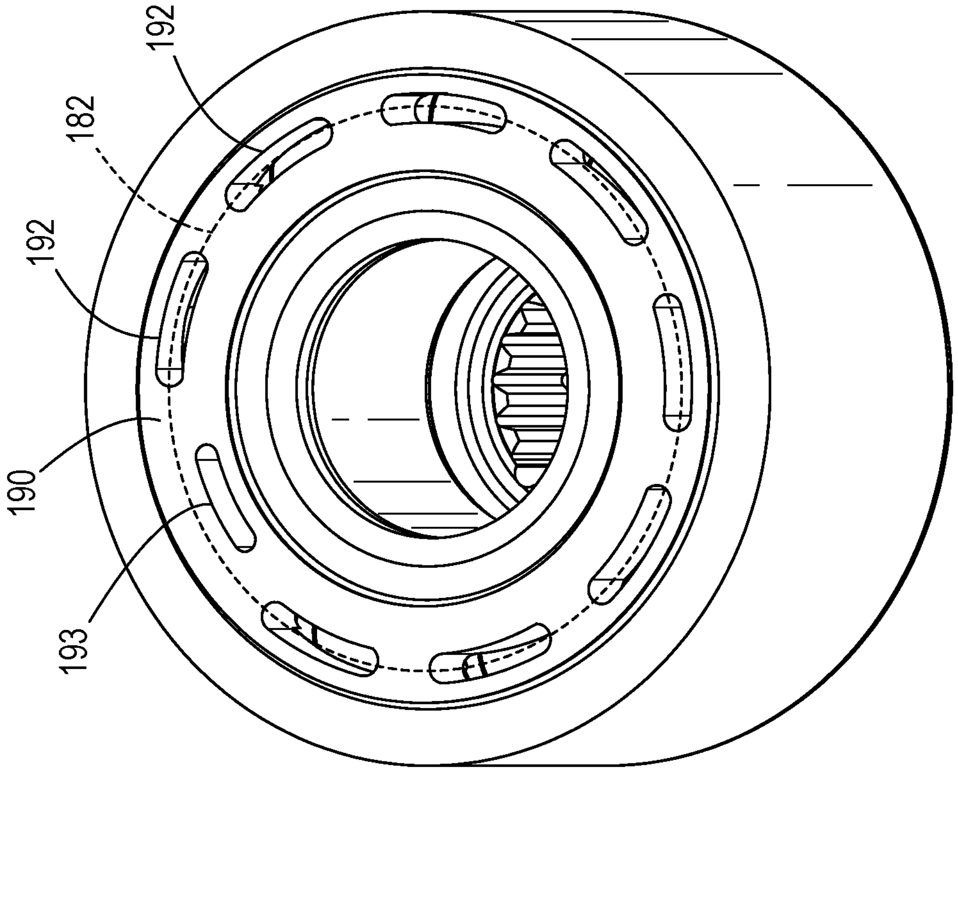
FIG. 9A is a perspective view of an embodiment of a plate for use with the valve plate of FIG. 8A or FIG. 8B.

FIG. 8A shows an alternate embodiment of a valve plate 92D for use with the rotary group 86. The valve plate 92D includes a third port 138D which is offset radially inwardly of the pitch circle 182 of the first port 130. The center of the third port 138D is located within an angular span θ of the second port 134. The valve plate 92D works with a different embodiment of the cylinder block end 190 for the cylinder block 74 as shown in FIG. 9A. A cylinder block end 190D has the plurality of slots 192 around the axis A1, with a slot 193 that is offset (inwardly) from the pitch circle 182. The slot 193 is only in communication with the third port 138D. Unlike FIG. 7, the pressures within the cylinder block 74 are not constant because the slot 193 is only in communication with the third port 138D and the slot 193 is sized differently than the other slots 192. A benefit to the construction of the slot 193 is more control of the working fluid being contributed to the cooling flow 62.

Figure 8B:
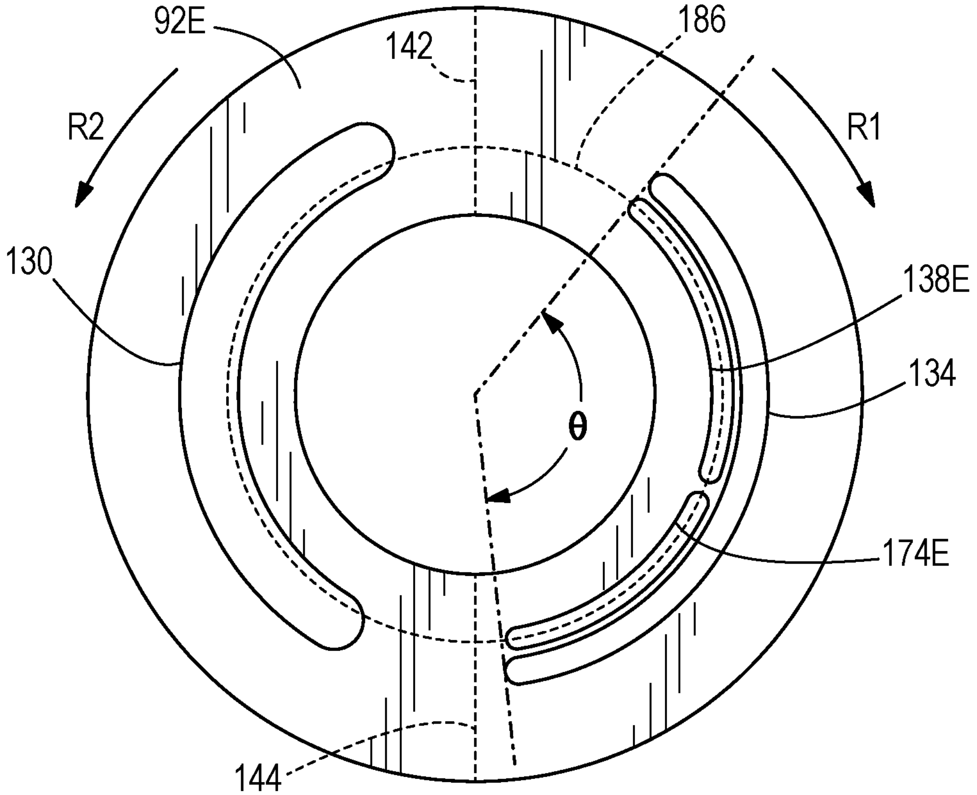
FIG. 8B is an end view of an embodiment of the valve plate of the integrated electro-hydraulic unit including the offset third port and an offset fourth port.

FIG. 8B shows an alternate embodiment of the valve plate 92E for use with the rotary group 86. The valve plate 92E includes a third port 138E and a fourth port 174E within the angular span θ of the second port 134 and at a common pitch circle 186 with the third port 138E. The valve plate 92E works with a different embodiment of the cylinder block end 190 for the cylinder block 74 as shown in FIG. 9B. A cylinder block end 190E has the plurality of slots 192 located on the pitch circle 182. The cylinder block end 190E also has the slot 193 and a slot 194 located inward of the pitch circle 182 as shown in FIG. 9B to match up with the pitch circle 186 of the third port 138E and the fourth port 174E. Like FIG. 8A, the pressures within the cylinder block 74 are not constant because the slots 193, 194 are only in fluid communication with the third and fourth port 138E, 174E.

Figure 15:
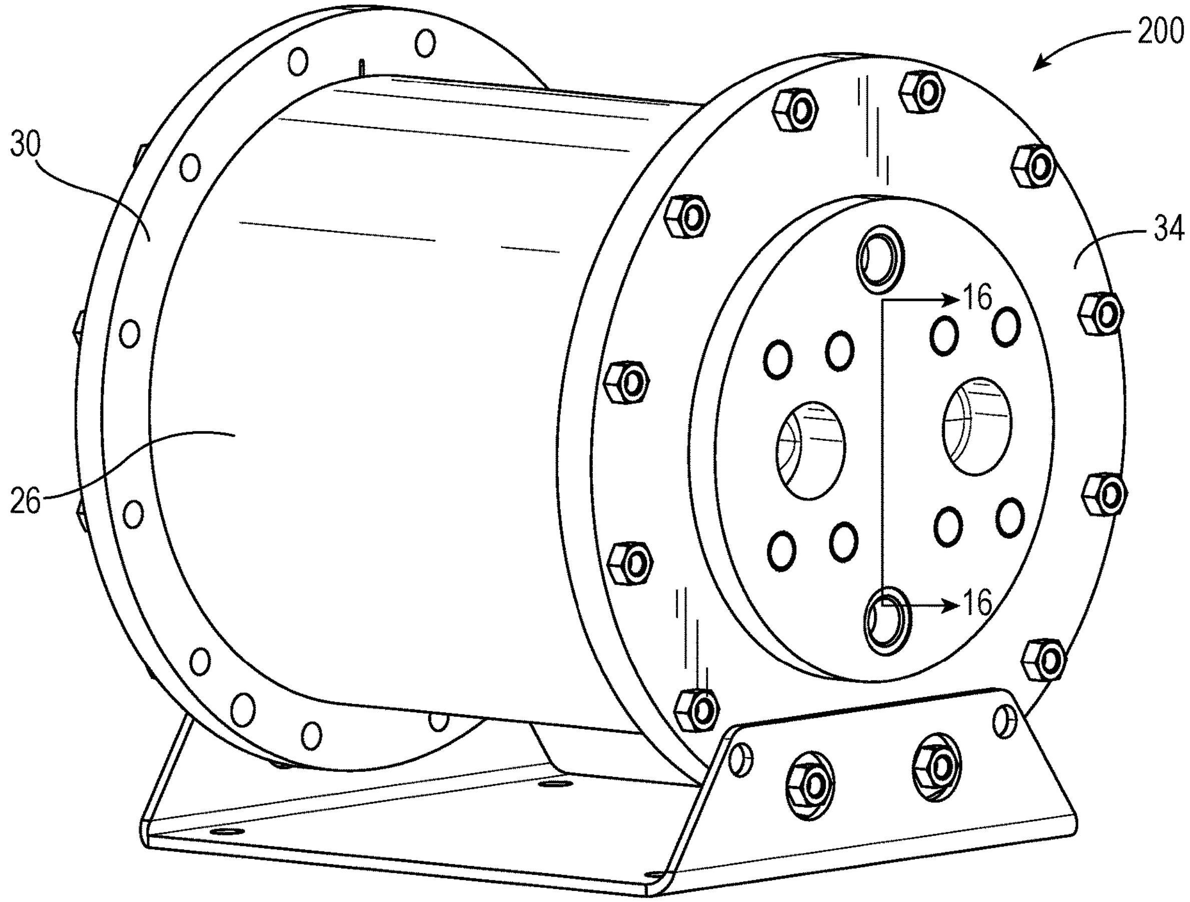
FIG. 15 is a perspective view of an embodiment of an integrated electro-hydraulic unit.

FIG. 15 illustrates an alternate embodiment of an integrated electro-hydraulic unit 200. FIG. 16 illustrates an alternate embodiment of a drive flange 201 within the integrated electro-hydraulic unit 200 (taken along line 16-16). The drive flange 201 is radially disposed from the axis A1 between an electric machine 204 and a cylinder block 208. The drive flange 201 is configured to define an interface between the electric machine 204 and the cylinder block 208 such that power from the electric machine 204 is transferred to the cylinder block 208 and vice versa. The cylinder block 208 is compatible with the working group 86 as described above. The electric machine 204 includes a stator 212 and a rotor 216. The rotor 216 is constructed from a plurality of stacked metal plates 220. The rotor 216 defines an axial span S1 measured parallel to the axis A1 between a first axial end 224 and a second axial end 228. The cylinder block 208 has a construction dissimilar from the rotor 216. For example, the cylinder block 208 has a uniform or monolithic construction. The cylinder block 208 includes a distal portion 232 radially spaced from the axis A1. The distal portion 232 defines an axial span S2 measured parallel to the axis A1 between a first axial end 236 and a second axial end 240 of the distal portion 232. The axial spans S1, S2 of the rotor 216 and the distal portion 232 are mismatched in size and/or position (e.g., the axial span S1 is greater than the axial span S2). As such, the drive flange 201 is provided as a radially interposed adapter, configured to transmit rotation between the rotor 216 and the distal portion 232.

As illustrated, at least a portion of the axial span S2 of the distal portion 232 axially overlaps at least a portion of the axial span S1 of the rotor 216. Within the overlapping portions of the axial spans S1, S2, a radial reference line (not shown) extending from the axis A1 intersects both the rotor 216 and the distal portion 232 of the cylinder block 208. The axial span S2 of the distal portion 232 proximal to the first axial end 236 of the distal portion 232 extends outside the axial span S1 proximal to the first axial end 224 of the rotor 216. A center of the axial span S2 of the distal portion 232 is axially offset from a center of the axial span S1 of the rotor 216. A minority of the axial span S1 of the rotor 216 overlaps with the axial span S2 of the distal portion 232. A majority of the axial span S2 of the distal portion 232 overlaps with the axial span S1 of the rotor 216.

Figure 17:
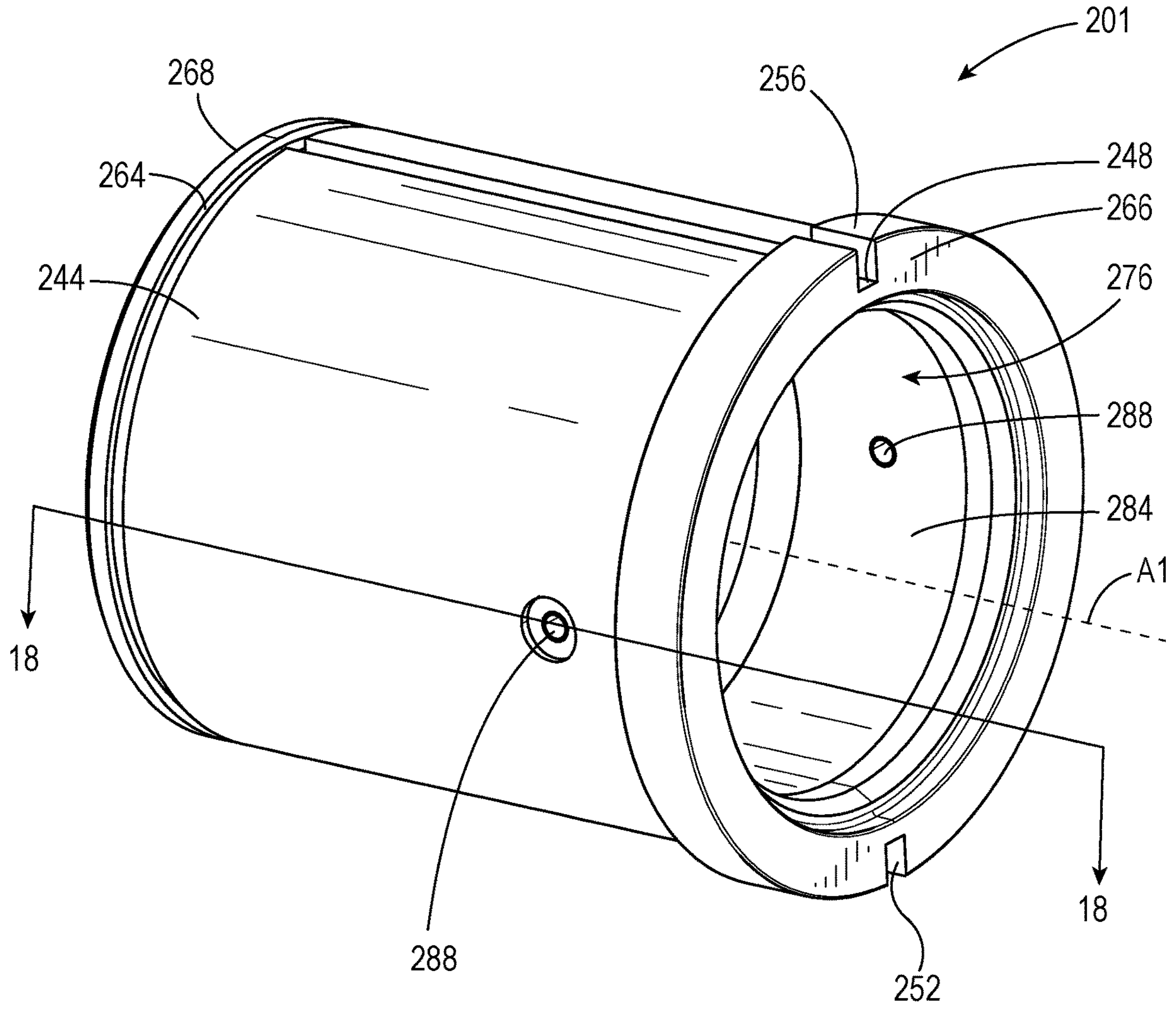
FIG. 17 is a perspective view the drive flange of FIG. 16.

FIG. 17 solely illustrates the drive flange 201. The drive flange 201 includes a rotor-receiving portion 244 that is configured to support the rotor 216. The rotor-receiving portion 244 has a length that corresponds to the axial span S1 of the rotor 216. The rotor-receiving portion 244 is radially outwards and may be formed by an outer cylindrical surface of the drive flange 201. The drive flange 201 includes a first keyseat 248 and a second keyseat 252 that are diametrically opposed. As illustrated, both the first and second keyseats 248, 252 intersect the rotor-receiving portion 244 such that they are configured to interface with an interior of the rotor 216. The first keyseat 248 and second keyseat 252 are diametrically opposed such that the keyseats 248 and 252 are symmetrically disposed about the axis A1. In other constructions, the drive flange 201 includes more than two keyseats that are symmetrically disposed about the axis A1. The symmetry of the keyseats 248 and 252 ensures that the drive flange 201 is balanced, thus preserving the balance of the working group 86. The plurality of stacked metal plates 220 of the rotor 216 include corresponding keyways (not shown). The drive flange 201 includes a stepped ledge 256 that is projected radially outward and is axially located between a first axial end 266 and the rotor-receiving portion 244 of the drive flange 201. The drive flange 201 includes a groove 264 located at a second axial end 268 of the drive flange 201. The groove 264, which extends in a circumferential direction about the axis A1, is formed immediately adjacent to the rotor-receiving portion 244. The groove 264 is configured to receive a split ring 272 as shown in FIG. 16 to retain the rotor 216 axially.

The rotor 216 is mounted to the rotor-receiving portion 244 of the drive flange 201 by sliding the plurality of stacked metal plates 220 on the rotor-receiving portion 244 such that the first axial end 224 of the rotor 216 abuts the stepped ledge 256 and the second axial end 228 of the rotor 216 is axially constrained against removal by the split ring 272. A first and second key (not shown) are inserted into the first keyseat 248, the second keyseat 252, and the keyways (not shown) such that the rotor 216 and the drive flange 201 are rotatably coupled.

Figure 18:
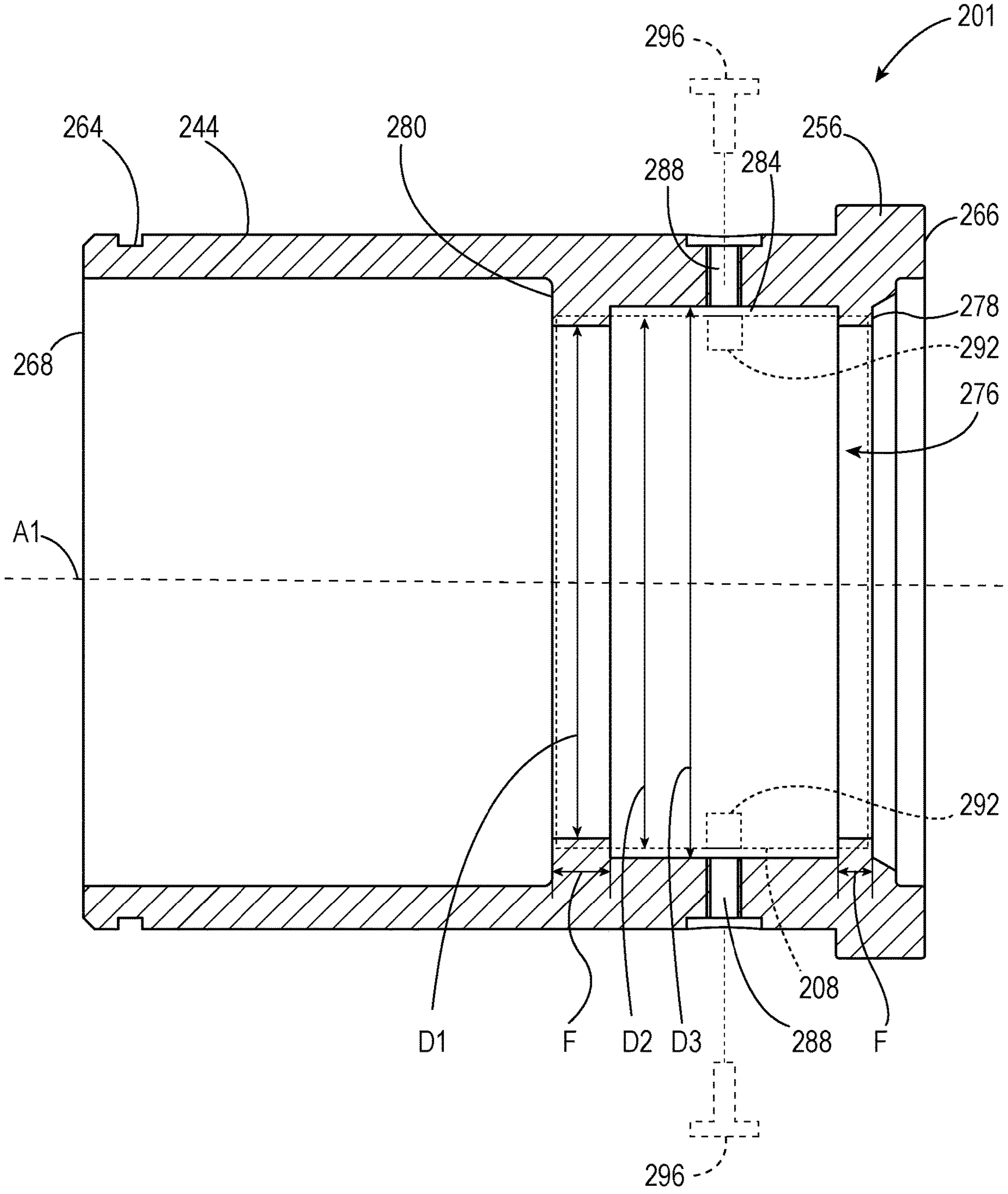
FIG. 18 is a longitudinal cross-section of the drive flange taken along line 18-18 of FIG. 17.

FIGS. 17 and 18 illustrate the drive flange 201 including a cylinder block-receiving interior portion 276 configured to receive the distal portion 232 of the cylinder block 208. The part of the cylinder block 208 providing the distal portion 232 is added in phantom lines in FIG. 18. The cylinder block-receiving interior portion 276 has a length that corresponds to the axial span S2 of distal portion 232 of the cylinder block 208. In other constructions, the length of the cylinder block-receiving interior portion 276 is within 5% of the axial span S2 of distal portion 232 of the cylinder block 208 such that a vast majority of the axial span S2 overlaps with the interior portion 276. In the illustrated construction, the cylinder block-receiving interior portion 276 is defined by a section of locally-increased wall thickness and is the only interior portion of the drive flange 201 configured for supporting the distal portion 232 of the cylinder block 208. The cylinder block-receiving interior portion 276 includes shrink fit interfaces F at a first axial end 278 and a second axial end 280 of the cylinder block-receiving interior portion 276. The distal portion 232 is coupled to the cylinder block-receiving interior portion 276 via an interference fit. A diameter D1 of the shrink fit interface F is configured to be slightly smaller than a diameter D2 of the distal portion 232 as exaggerated in FIG. 18. To assemble the drive flange 201 to the cylinder block 208 via the interference fit, the distal portion 232 is cooled to decrease the diameter D2 and the drive flange 201 is heated to increase the diameter D1. The diameter changes of D1 and D2 will permit the cylinder block 208 to fit within the drive flange 201. Upon temperature equilibration of the cylinder block 208 and the drive flange 201, the diameter D1 returns to a slightly smaller size than the diameter D2 such that cylinder block 208 and the drive flange 201 are held together by an interference fit. In other constructions, the distal portion 232 of the cylinder block is press fit into the cylinder block-receiving interior portion 276 of the drive flange 201. The second axial end 240 of the distal portion 232 of the cylinder block 208 includes edge rounded surfaces in mutual contact with the shrink fit interfaces F of the cylinder block-receiving portion 276.

The cylinder block-receiving interior portion 276 further includes a circumferential pocket 284. The pocket 284 is configured to receive glue to secure the distal portion 232 of the cylinder block 208 to the cylinder block-receiving interior portion 276. The pocket 284 has a diameter D3 that is larger than D1 and is axially disposed between the shrink fit interface F. In other constructions, the diameter D3 is at least 0.10 millimeters greater than the diameter D1 of the shrink fit interface F to preserve room for the glue. The diameter D3 in relation to the diameter D1 (thus, the depth of the pocket 284) is exaggerated in FIG. 18 for the purpose of illustration. The glue is applied prior to the interference fit between the drive flange 201 and the cylinder block 208. In other constructions, the glue is applied after completion of the interference fit by injecting the glue through apertures 288. The apertures 288 are diametrically-opposed from one another such that the apertures 288 are symmetric about the axis A1 to preserve the balance of the working group 86. The apertures 288 are configured to align with apertures 292 on the distal portion 232. In other constructions, fasteners 296 extend through the apertures 288 and 292 to couple the drive flange 201 to the cylinder block 208 without the use of glue. In other constructions, the fasteners 296 couple the drive flange 201 to the cylinder block 208 in addition to gluing the drive flange 201 and the cylinder block 208.

Although the invention has been described in detail with reference to certain preferred embodiments, variations and modifications exist within the scope and spirit of one or more independent aspects of the invention as described.

What is claimed is:

1. An integrated electro-hydraulic unit comprising:

a hydraulic machine including a shaft and a cylinder block coupled to the shaft, the shaft configured to rotate around a central axis, the cylinder block having a plurality of pistons within the cylinder block, the cylinder block configured to rotate about the central axis to generate reciprocating movement of each of the plurality of pistons, the cylinder block having a distal portion spaced from the central axis, the distal portion having an axial span measured parallel to the central axis between first and second axial ends of the distal portion;

an electric machine including a stator and a rotor comprising a plurality of rotor plates, the rotor having an axial span measured parallel to the central axis between first and second axial ends of the rotor, wherein the axial span of the rotor is larger than the axial span of the distal portion of the cylinder block; and a drive flange situated radially outside the cylinder block and radially within the rotor to define an interface between the distal portion of the cylinder block and the rotor, wherein the plurality of stacked plates is secured to a rotor-receiving exterior portion of the drive flange, and the distal portion of the cylinder block is secured to a cylinder block-receiving interior portion of the drive flange, and wherein the axial span of the distal portion of the cylinder block extends outside the axial span of the rotor.

2. The integrated electro-hydraulic unit of claim 1, wherein the cylinder block-receiving interior portion of the drive flange is defined by a section of locally-increased wall thickness, the cylinder block-receiving interior portion having an axial length corresponding to the axial span of the distal portion of the cylinder block.

3. The integrated electro-hydraulic unit of claim 1, wherein the axial span of the distal portion of the cylinder block and the axial span of the rotor have axially overlapping portions in which a radial reference line from the central axis intersects both the distal portion of the cylinder block and the rotor.

4. The integrated electro-hydraulic unit of claim 1, wherein the drive flange further includes a first keyseat and a second keyseat, the first and second keyseats are formed to intersect the rotor-receiving portion, the first and second keyseats are diametrically opposed about the central axis.

5. The integrated electro-hydraulic unit of claim 1, wherein the drive flange further includes a stepped ledge projected radially outward, and wherein the first axial end of the rotor abuts the stepped ledge.

6. The integrated electro-hydraulic unit of claim 1, wherein the drive flange further includes a circumferential groove formed in the rotor-receiving exterior portion about the central axis, the circumferential groove receiving a split ring to abut the second axial end of the rotor.

7. The integrated electro-hydraulic unit of claim 1, wherein the drive flange further includes a circumferential pocket formed in the cylinder block-receiving interior portion.

8. The integrated electro-hydraulic unit of claim 7, wherein the distal portion of the cylinder block is secured to the cylinder block-receiving interior portion via glue in the circumferential pocket.

9. The integrated electro-hydraulic unit of claim 1, wherein the drive flange further includes an aperture positioned to intersect the distal portion of the cylinder block, the integrated electro-hydraulic unit further comprising a fastener extending radially inward thorough the aperture and into contact with the distal portion of the cylinder block.

10. The integrated electro-hydraulic unit of claim 1, wherein the drive flange is coupled to the cylinder block distal portion via an interference fit.

11. The integrated electro-hydraulic unit of claim 1, wherein the cylinder block has a monolithic construction.

12. An integrated electro-hydraulic unit comprising:

a hydraulic machine including a shaft and a cylinder block coupled to the shaft, the shaft configured to rotate around a central axis, the cylinder block having a plurality of pistons within the cylinder block, the cylinder block configured to rotate about the central axis to generate reciprocating movement of each of the plurality of pistons, the cylinder block having a distal portion spaced from the central axis, the distal portion having an axial span measured parallel to the central axis between first and second axial ends of the distal portion;

an electric machine including a stator and a rotor comprising a plurality of rotor plates, the rotor having an axial span measured parallel to the central axis between first and second axial ends of the rotor; and a drive flange situated radially outside the cylinder block and radially within the rotor to define an interface between the cylinder block and the rotor, wherein the plurality of stacked plates is secured to a rotor-receiving exterior portion of the drive flange, and the distal portion of the cylinder block is secured to a cylinder block-receiving interior portion of the drive flange, and wherein the first end of the distal portion of the cylinder block lies axially within the axial span of the rotor and the second end of the distal portion of the cylinder block lies axially outside the axial span of the rotor such that only a portion of the axial span of the distal portion of the cylinder block overlaps the axial span of the rotor.

13. The integrated electro-hydraulic unit of claim 12, wherein the axial span of the rotor is larger than the axial span of the distal portion of the cylinder block.

14. The integrated electro-hydraulic unit of claim 12, wherein a center of the axial span of the rotor is axially offset from a center of the axial span of the distal portion of the cylinder block.

15. The integrated electro-hydraulic unit of claim 12, wherein a minority of the axial span of the rotor overlaps with the axial span of the distal portion of the cylinder block.

16. The integrated electro-hydraulic unit of claim 12, wherein a majority of the axial span of distal portion of the cylinder block overlaps with the axial span of the rotor.

* * * * *